United States Patent
Park et al.

(10) Patent No.: US 12,555,544 B2
(45) Date of Patent: Feb. 17, 2026

(54) GATE DRIVING CIRCUIT AND DISPLAY DEVICE INCLUDING THE SAME

(71) Applicant: LG Display Co., Ltd., Seoul (KR)

(72) Inventors: Jae Sung Park, Paju-si (KR); Hong Jae Shin, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/801,139

(22) Filed: Aug. 12, 2024

(65) Prior Publication Data

US 2025/0140203 A1    May 1, 2025

(30) Foreign Application Priority Data

Oct. 27, 2023 (KR) .................. 10-2023-0145285

(51) Int. Cl.
*G09G 3/3266* (2016.01)
*G09G 3/3258* (2016.01)

(52) U.S. Cl.
CPC ......... *G09G 3/3266* (2013.01); *G09G 3/3258* (2013.01); *G09G 2300/0819* (2013.01); *G09G 2300/0852* (2013.01); *G09G 2310/0267* (2013.01); *G09G 2310/0286* (2013.01); *G09G 2310/061* (2013.01); *G09G 2310/08* (2013.01)

(58) Field of Classification Search
CPC ............... G09G 3/3266; G09G 3/3258; G09G 2300/0819; G09G 2300/0852; G09G 2310/0286; G09G 2310/061; G09G 2310/08; G09G 2310/0267
USPC .......................................................... 345/55
See application file for complete search history.

(56) References Cited

U.S. PATENT DOCUMENTS

| | | | |
|---|---|---|---|
| 2016/0266699 A1* | 9/2016 | Zhao ................... | G09G 3/3677 |
| 2017/0193889 A1* | 7/2017 | Li ............................ | G09G 3/20 |
| 2018/0268755 A1* | 9/2018 | Chen ................... | G09G 3/2092 |
| 2018/0335814 A1* | 11/2018 | Shao ........................ | G06F 1/24 |
| 2019/0164465 A1* | 5/2019 | Hu ......................... | G11C 19/28 |
| 2020/0035180 A1* | 1/2020 | Chen ................... | G09G 3/3677 |
| 2021/0201813 A1* | 7/2021 | Oh ....................... | G09G 3/3266 |
| 2021/0209994 A1* | 7/2021 | Liang ................... | G09G 3/2092 |
| 2021/0225235 A1* | 7/2021 | Mou ..................... | G09G 3/2092 |
| 2021/0333973 A1* | 10/2021 | Su ........................ | G11C 19/28 |
| 2023/0009494 A1* | 1/2023 | Noh ..................... | G09G 3/3266 |

(Continued)

FOREIGN PATENT DOCUMENTS

| KR | 10-2020-0048784 A | 5/2020 |
|---|---|---|
| KR | 10-2022-0086869 A | 6/2022 |

(Continued)

*Primary Examiner* — Tom V Sheng
(74) *Attorney, Agent, or Firm* — Birch, Stewart, Kolasch & Birch, LLP

(57) ABSTRACT

A display device in one example can include a display panel and a gate driver having stages. Each of the stages includes a first circuit, a second circuit, and a third circuit to generate gate signals. The first circuit controls the second circuit, the second circuit controls a first node, a second node, and a third node, and the third circuit outputs a carry signal and the gate signals. The first circuit includes a first reset transistor configured to turn on based on a potential of an Mth node to output the reset signal, and a compensation capacitor having a first electrode connected to a gate electrode of the first reset transistor, and a second electrode connected to the second electrode of the first reset transistor.

12 Claims, 12 Drawing Sheets

(56) References Cited

U.S. PATENT DOCUMENTS

2023/0010366 A1* 1/2023 Son .................. G11C 19/28
2024/0005871 A1* 1/2024 Zhang ............... G11C 19/28
2025/0006805 A1* 1/2025 Liu ................. H10D 30/6729

FOREIGN PATENT DOCUMENTS

KR    10-2022-0092208 A    7/2022
KR    10-2023-0065069 A    5/2023

\* cited by examiner

GATE DRIVING CIRCUIT AND DISPLAY DEVICE INCLUDING THE SAME

CROSS-REFERENCE TO RELATED APPLICATIONS

This application claims priority to Korean Patent Application No. 10-2023-0145285, filed in the Republic of Korea on Oct. 27, 2023, the entire contents of which is hereby expressly incorporated by reference into the present application.

BACKGROUND

Field

The present disclosure relates to a gate driving circuit and a display device including the same.

Discussion of the Related Art

With the development of information technology, the market for display devices that are media for connection between users and information has been growing. Accordingly, display devices such as a light-emitting display (LED) device, a quantum dot display (QDD), and a liquid crystal display (LCD) have been increasingly used.

Each of the above display devices includes a display panel including subpixels, a driver configured to output a driving signal for driving of the display panel, and a power supply configured to generate power to be supplied to the display panel or the driver.

In such a display device, when driving signals, for example, gate signals and data signals, are supplied to subpixels formed in a display panel, a selected one of the subpixels can transmit light therethrough or can directly emit light, thereby displaying an image.

SUMMARY OF THE DISCLOSURE

Accordingly, the present disclosure is directed to a gate driving circuit and a display device including the same that substantially obviate one or more problems due to limitations and disadvantages of the related art.

This present disclosure in examples provides a gate driving circuit and a display device including the same, which are capable of improving driving stability and driving reliability by relieving a limitation of shifting of a threshold voltage of a transistor by changing an input signal to a pulse form or an alternating current form rather than a direct current form, and preventing a limitation of deterioration of charging characteristics that may be caused by changing an input signal to a pulse form or alternating current form.

Additional advantages, objects, and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these objects and other advantages and in accordance with the purpose of the disclosure, as embodied and broadly described herein, a display device includes a display panel configured to display an image, and a gate driver having stages each including a first circuit, a second circuit, and a third circuit to generate gate signals for driving the display panel, wherein the first circuit controls the second circuit based on a start signal, a reset signal, and a selection signal, the second circuit controls a first node, a second node, and a third node in response to an operation of the first circuit, and the third circuit outputs a carry signal and the gate signals based on a carry clock signal and scan clock signals in response to an operation of the second circuit, and the first circuit includes a first reset transistor configured to turn on based on a potential of an Mth node to output the reset signal applied through a first electrode through a second electrode, and a compensation capacitor having a first electrode connected to a gate electrode of the first reset transistor, and a second electrode connected to the second electrode of the first reset transistor.

According to aspect of the present disclosure, the reset signal can be applied in a pulse form. The reset signal can be applied in a pulse form once during each of a blank period and an active period.

According to aspect of the present disclosure, the first circuit can include a first transistor configured to turn on based on the selection signal to output an (I-2)th carry signal applied through a first electrode through a second electrode, a second transistor configured to turn on based on the selection signal to transmit the (I-2)th carry signal to the Mth node, a third transistor configured to turn on based on a potential of the Mth node to transmit a first high voltage applied through a first high-voltage line to a node to which a first electrode of the second transistor and the second electrode of the first transistor are connected, a fourth transistor defined as the first reset transistor configured to turn on based on a potential of the Mth node to output the reset signal applied through the first electrode through the second electrode, a fifth transistor configured to turn on based on the reset signal to transmit the reset signal applied through the fourth transistor to the second node, a sixth transistor configured to turn on based on the reset signal to electrically connect the first node and the second node to each other, a seventh transistor configured to turn on based on the start signal to connect the first node and the second node to each other, and an eighth transistor configured to turn on based on the start signal to transit a low voltage to the second node.

According to aspect of the present disclosure, the first circuit can include a first transistor having a gate electrode connected to a selection signal line to which the selection signal is applied, and a first electrode connected to an (I-2)th carry signal output terminal through which an (I-2)th carry signal is output, a second transistor having a gate electrode connected to the selection signal line, a first electrode connected to a second electrode of the first transistor, and a second electrode connected to the Mth node, a third transistor having a gate electrode connected to the Mth node, a first electrode connected to the first electrode of the second transistor and the second electrode of the first transistor, and a second electrode connected to a first high-voltage line to which a first high voltage is applied, a fourth transistor having a gate electrode connected to the Mth node, a first electrode connected to a reset signal line to which the reset signal is applied, and a second electrode connected to the second electrode of the compensation capacitor, and defined as the first reset transistor, a fifth transistor having a gate electrode connected to the reset signal line, a first electrode connected to the second electrode of the fourth transistor, and a second electrode connected to the second node, a sixth transistor having a gate electrode connected to the reset signal line, a first electrode connected to the second node and the second electrode of the fifth transistor, and a second electrode connected to the first node, a seventh transistor having a gate electrode connected to a start signal line to which the start signal is applied, a first electrode connected to the first node, and a second electrode connected to the second node, and an eighth transistor having a gate electrode connected to the start signal line, a first electrode connected to the second node and the second electrode of the seventh transistor, and a second electrode connected to a voltage line to which a low voltage is applied.

According to aspect of the present disclosure, the third circuit can output one carry signal and four gate signals based on the carry clock signal and the scan clock signals in response to an operation of the second circuit.

In another aspect of the present disclosure, a gate driving circuit includes stages each including a first circuit, a second circuit, and a third circuit to generate gate signals, wherein the first circuit controls the second circuit based on a start signal, a reset signal, and a selection signal, the second circuit controls a first node, a second node, and a third node in response to an operation of the first circuit, and the third circuit outputs a carry signal and the gate signals based on a carry clock signal and scan clock signals in response to an operation of the second circuit, and the first circuit includes a first reset transistor configured to turn on based on a potential of an Mth node to output the reset signal applied through a first electrode through a second electrode, and a compensation capacitor having a first electrode connected to a gate electrode of the first reset transistor, and a second electrode connected to the second electrode of the first reset transistor.

According to aspect of the present disclosure, the reset signal can be applied in a pulse form.

According to aspect of the present disclosure, the first circuit can include a first transistor configured to turn on based on the selection signal to output an (I−2)th carry signal applied through a first electrode through a second electrode, a second transistor configured to turn on based on the selection signal to transmit the (I−2)th carry signal to the Mth node, a third transistor configured to turn on based on a potential of the Mth node to transmit a first high voltage applied through a first high-voltage line to a node to which a first electrode of the second transistor and the second electrode of the first transistor are connected, a fourth transistor defined as the first reset transistor configured to turn on based on a potential of the Mth node to output the reset signal applied through the first electrode through the second electrode, a fifth transistor configured to turn on based on the reset signal to transmit the reset signal applied through the fourth transistor to the second node, a sixth transistor configured to turn on based on the reset signal to electrically connect the first node and the second node to each other, a seventh transistor configured to turn on based on the start signal to connect the first node and the second node to each other, and an eighth transistor configured to turn on based on the start signal to transit a low voltage to the second node.

According to aspect of the present disclosure, the first circuit can include a first transistor having a gate electrode connected to a selection signal line to which the selection signal is applied, and a first electrode connected to an (I−2)th carry signal output terminal through which an (I−2)th carry signal is output, a second transistor having a gate electrode connected to the selection signal line, a first electrode connected to a second electrode of the first transistor, and a second electrode connected to the Mth node, a third transistor having a gate electrode connected to the Mth node, a first electrode connected to the first electrode of the second transistor and the second electrode of the first transistor, and a second electrode connected to a first high-voltage line to which a first high voltage is applied, a fourth transistor having a gate electrode connected to the Mth node, a first electrode connected to a reset signal line to which the reset signal is applied, and a second electrode connected to the second electrode of the compensation capacitor, and defined as the first reset transistor, a fifth transistor having a gate electrode connected to the reset signal line, a first electrode connected to the second electrode of the fourth transistor, and a second electrode connected to the second node, a sixth transistor having a gate electrode connected to the reset signal line, a first electrode connected to the second node and the second electrode of the fifth transistor, and a second electrode connected to the first node, a seventh transistor having a gate electrode connected to a start signal line to which the start signal is applied, a first electrode connected to the first node, and a second electrode connected to the second node, and an eighth transistor having a gate electrode connected to the start signal line, a first electrode connected to the second node and the second electrode of the seventh transistor, and a second electrode connected to a voltage line to which a low voltage is applied.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

A display device according to the present disclosure can be implemented as a television, a video player, a personal computer (PC), a home theater, an automotive electric device, or a smartphone, but is not limited thereto. The display device according to the present disclosure can be implemented as an LED device, a QDD, or an LCD. For convenience of description, an LED device that directly emits light based on an inorganic light-emitting diode or an organic light-emitting diode will hereinafter be taken as an example.

In addition, a thin film transistor (TFT) described below can be implemented as an n-type TFT, as a p-type TFT, or in a form in which n-type and p-type are present together. The TFT is a three-electrode element including a gate, a source, and a drain. The source is an electrode that supplies a carrier to a transistor. In the TFT, a carrier starts flowing from the source. The drain is an electrode through which a carrier exits the TFT. For example, in the TFT, a carrier flows from the source to the drain.

In the case of the p-type TFT, since the carrier is a hole, a source voltage is higher than a drain voltage so that the hole can flow from the source to the drain. In the p-type TFT, a hole flows from the source to the drain side, and thus current flows from the source to the drain side. In contrast, in the case of the n-type TFT, since an electron is a carrier, the source voltage is lower than the drain voltage so that an electron can flow from the source to the drain. In the n-type TFT, an electron flows from the source to the drain side, and thus current flows from the drain to the source side. However, the source and the drain of the TFT can be changed depending on the applied voltage. Reflecting this, in the following description, one of the source and drain will be described as a first electrode, and the other of the source and drain will be described as a second electrode.

Features of various embodiments of the present disclosure can be partially or entirely coupled to or combined with each other and can be operated, linked, or driven together in various ways. Embodiments of the present disclosure can be carried out independently from each other, or can be carried out together in co-dependent or related relationship.

Further, the term "can" encompasses all the meanings and coverages of the term "may." The term "disclosure" is interchangeably used with, or encompasses all the meanings and coverages of, the term "invention."

All the components of each display device or apparatus according to all embodiments of the present disclosure are operatively coupled and configured.

Figure 1:
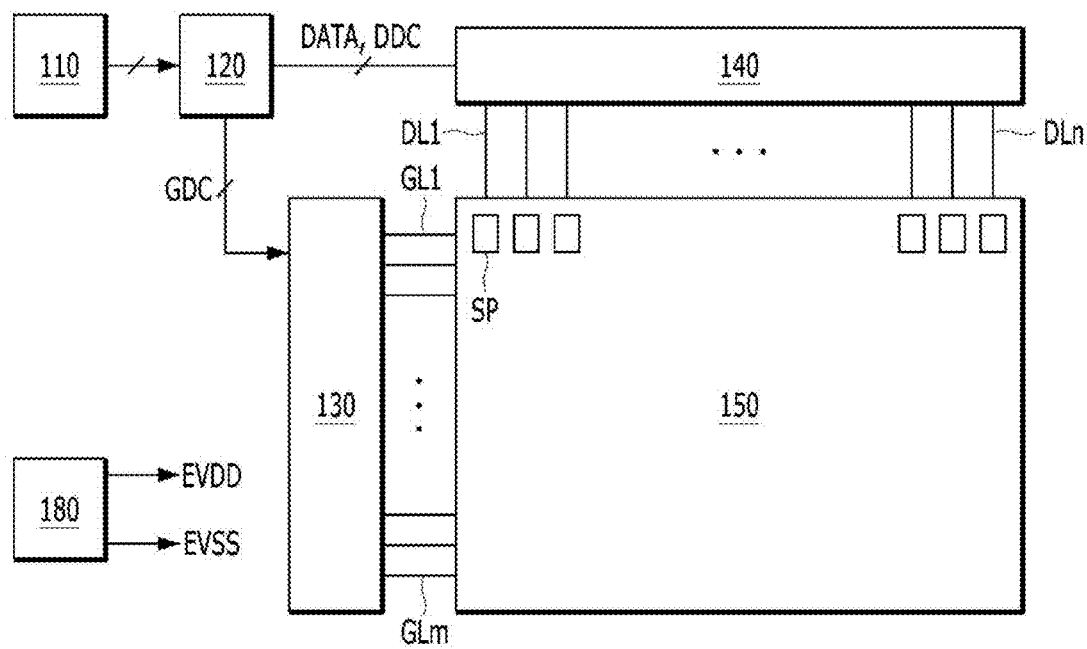
FIG. 1 is a block diagram schematically illustrating an LED device.
Figure 2:
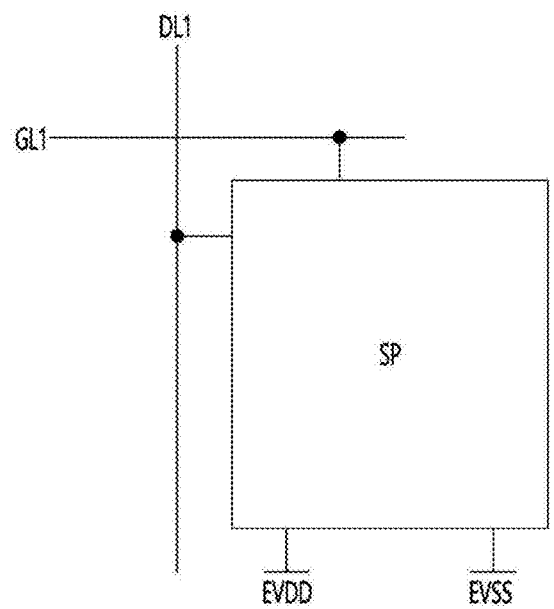
FIG. 2 is a block diagram schematically illustrating a subpixel illustrated in FIG. 1.

FIG. 1 is a block diagram schematically illustrating an LED device, and FIG. 2 is a block diagram schematically illustrating a subpixel illustrated in FIG. 1.

As illustrated in FIGS. 1 and 2, the LED device can include an image supply 110, a timing controller 120, a gate driver (gate driving circuit) 130, a data driver (data driving circuit) 140, a display panel 150, a power supply 180, etc.

The image supply (set or host system) 110 can output various driving signals together with an externally-supplied image data signal or an image data signal stored in an internal memory. The image supply 110 can supply the data signal and the various driving signals to the timing controller 120.

The timing controller 120 can output a gate timing control signal GDC for control of operation timing of the gate driver 130, a data timing control signal DDC for control of operation timing of the data driver 140, various synchronization signals, etc. The timing controller 120 can supply a data signal DATA supplied from the image supply 110 together with the data timing control signal DDC to the data driver 140. The timing controller 120 can take the form of an integrated circuit (IC) and be mounted on a printed circuit board, but is not limited thereto.

The gate driver 130 can output a gate signal (or gate voltage) in response to the gate timing control signal GDC supplied from the timing controller 120. The gate driver 130 can supply the gate signal to each of subpixels included in the display panel 150 through gate lines GL1 to GLm. The gate driver 130 can take the form of an IC or can be formed directly on the display panel 150 in a GIP manner, but is not limited thereto.

The data driver 140 can sample and latch the data signal DATA in response to the data timing control signal DDC supplied from the timing controller 120, convert the resulting digital data signal into an analog data voltage based on a gamma reference voltage, and output the converted analog data voltage. The data driver 140 can supply data voltages to the subpixels included in the display panel 150 through data lines DL1 to DLn. The data driver 140 can take the form of an IC and be mounted on the display panel 150 or on the printed circuit board, but is not limited thereto.

The power supply 180 can generate a high-potential voltage and a low-potential voltage based on an external input voltage supplied from the outside and output the high-potential voltage and the low-potential voltage through a high-potential power line EVDD and a low-potential power line EVSS. The power supply 180 can generate and output not only the high-potential voltage and the low-potential voltage, but also a voltage required to drive the scan driver 130 or a voltage required to drive the data driver 140.

The display panel 150 can display an image in response to a driving signal including a gate signal and a data voltage, a driving voltage including a high-potential voltage and a low-potential voltage, etc. Subpixels of the display panel 150 directly emit light. The display panel 150 can be manufactured based on a rigid or flexible substrate of glass, silicon, polyimide, etc. Further, the subpixels that emit light can include pixels including red, green, and blue, or pixels including red, green, blue, and white.

For example, one subpixel SP can be connected to the first data line DL1, the first gate line GL1, the high-potential power line EVDD, and the low-potential power line EVSS, and can include a pixel circuit including a switching transistor, a driving transistor, a capacitor, an organic light-emitting diode, etc. The subpixel SP used in the LED device directly emits light, and thus has a complex circuit configuration. In addition, there are various compensation circuits that compensate for deterioration of not only the organic light-emitting diode that emits light, but also the driving transistor that supplies a driving current required to drive the organic light-emitting diode. Therefore, note that the subpixel SP is simply shown in the form of a block.

Meanwhile, the timing controller 120, the gate driver 130, the data driver 140, etc., have been described above as having individual configurations. However, one or more of the timing controller 120, the gate driver 130, and the data driver 140 can be integrated into one IC depending on the implementation scheme of the LED device.

Figure 3:
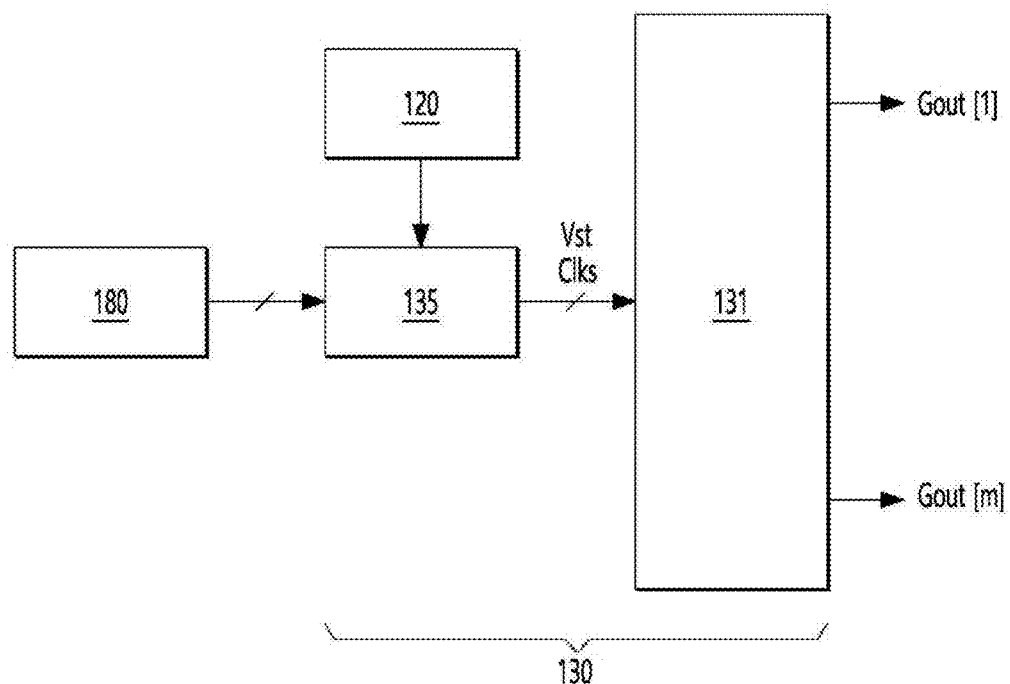
FIGS. 3 and 4 are diagrams for describing a configuration of a gate-in-panel (GIP)-type gate driver.
Figure 4:
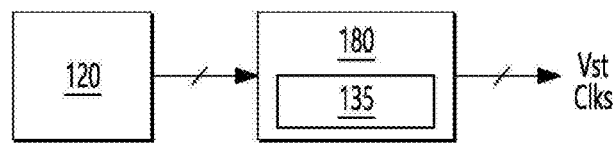
Figure 5:
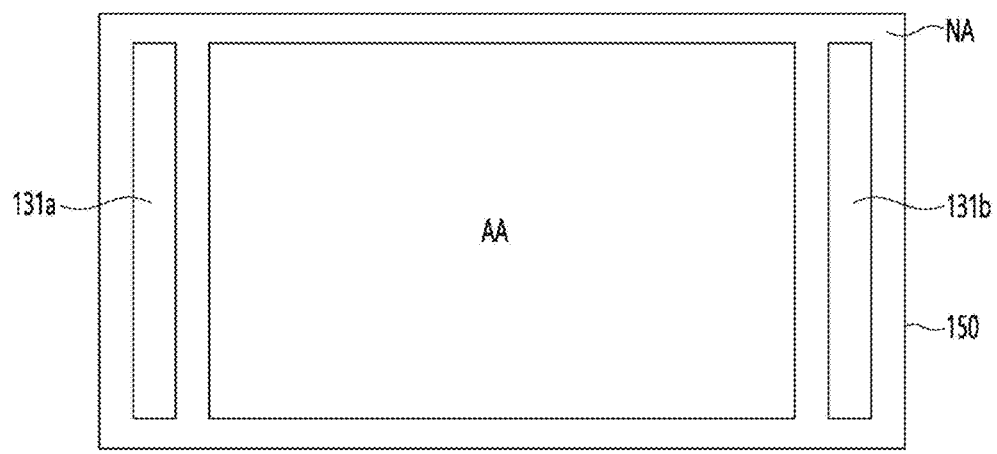
FIG. 5 is a diagram illustrating an arrangement example of the GIP-type gate driver.

FIGS. 3 and 4 are diagrams for describing a configuration of a GIP-type gate driver, and FIG. 5 is a diagram illustrating an arrangement example of the GIP-type gate driver.

As illustrated in FIG. 3, the GIP-type gate driver 130 can include a shift register 131 and a level shifter 135. The level shifter 135 can generate clock signals Clks, a start signal Vst, etc. based on signals and voltages output from the timing controller 120 and the power supply 180. The shift register 131 can operate based on the clock signals Clks and the start signal Vst output from the level shifter 135 and output gate signals Gout[1] to Gout[m].

As illustrated in FIGS. 3 and 4, unlike the shift register 131, the level shifter 135 can independently take the form of an IC or be included in the power supply 180. However, this is only an example and the present disclosure is not limited thereto.

As illustrated in FIG. 5, in the GIP-type gate driver, first and second shift registers 131a and 131b configured to output gate signals can be disposed in a non-active area NA of the display panel 150. The first and second shift registers 131a and 131b can each take the form of a thin film on the display panel 150 using a GIP method. The first and second shift registers 131a and 131b are shown as being disposed on the left and right side of the non-active area NA of the display panel 150, respectively, as an example. However, the present disclosure is not limited thereto.

Figure 6:
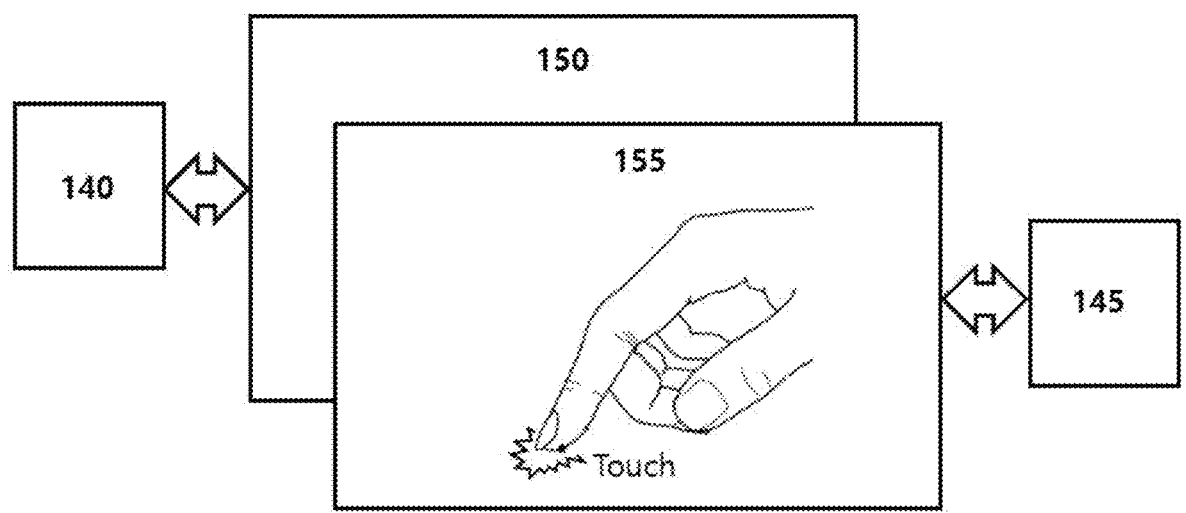
FIG. 6 is a block diagram for schematically describing a configuration of a display device having a touch sensor.
Figure 7:
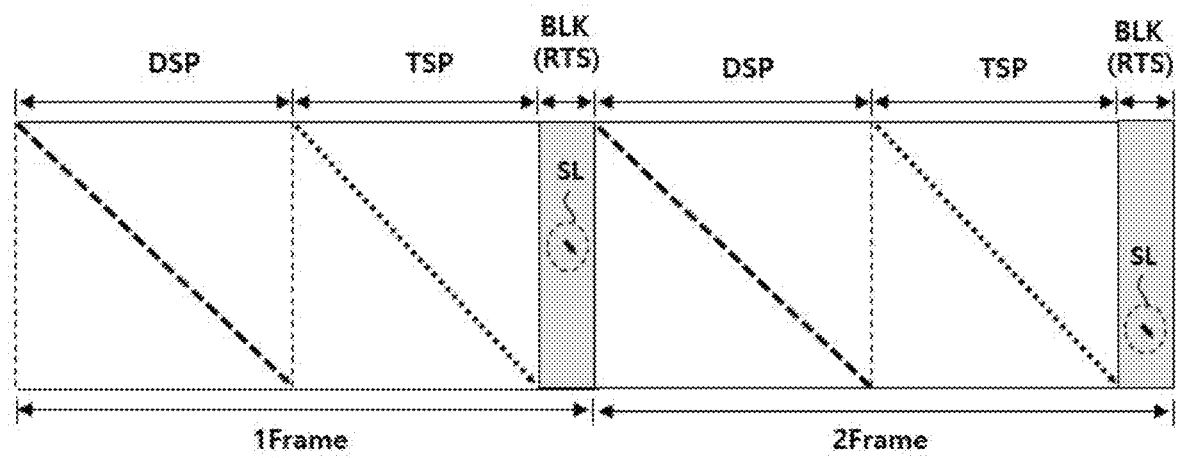
FIG. 7 is a waveform diagram for schematically describing a method of driving the display device having the touch sensor.
Figure 8:
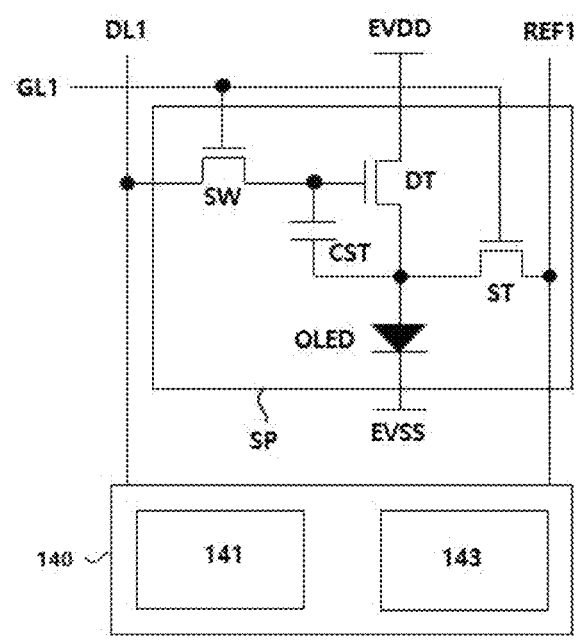
FIG. 8 is an example diagram for describing a subpixel that can be sensed in real time.

FIG. 6 is a block diagram for schematically describing a configuration of a display device having a touch sensor, FIG. 7 is a waveform diagram for schematically describing a method of driving the display device having the touch sensor, and FIG. 8 is an example diagram for describing a subpixel that can be sensed in real time.

As illustrated in FIG. 6, the display panel 150 that displays an image can have a touch sensor 155 capable of receiving input of a user using a touch method. The touch sensor 155 can have touch electrodes for detecting whether or not the display panel 150 is touched, location information, etc. The touch sensor 155 can operate based on a capacitance method, etc.

The display panel 150 can be driven by a data driver 140 connected to a data line, and the touch sensor 155 can be driven by a touch driver 145 connected to a sensing line. The display panel 150 and the touch sensor 155 can be formed as separate components, or can be integrated into one panel.

When the display panel 150 and the touch sensor 155 are integrated into one panel, the touch sensor 155 can be formed separately on the display panel 150 or can be implemented as an electrode formed on the display panel 150. Hereinafter, an example in which the touch sensor 155 is implemented as an electrode formed on the display panel 150 will be described.

As illustrated in FIGS. 6 and 7, when the touch sensor 155 is implemented as an electrode formed on the display panel 150, the display panel 150 and the touch sensor 155 can be divided using a time division method and controlled (driven).

For example, an image display operation of the display panel 150 can be performed during a display period DSP, which is a first time of a first frame 1Frame, and a sensing operation of the touch sensor 155 can be performed during a touch sensing period TSP, which is a second time of the first frame 1Frame. This flow can appear the same in all frames, including a second frame 2Frame.

The display device having the touch sensor can include a real-time sensing period RTS for determining and compensating for deterioration of an element included in the display panel 150, for example, a driving transistor or an organic light-emitting diode.

The real-time sensing period RTS can be included in a blank period BLK rather than an active period including the display period DSP and the touch sensing period TSP. During the real-time sensing period RTS, a circuit related to the sensing operation can define only a specific line as a sensing line SL and sense an element included in at least one subpixel included in the sensing line SL.

As illustrated in FIG. 8, a subpixel SP that can be sensed in real time can include a switching transistor SW, a driving transistor DT, a sensing transistor ST, a capacitor CST, an organic light-emitting diode OLED, etc.

The driving transistor DT can have a gate electrode connected to a first electrode of the capacitor CST, a first electrode connected to the high-potential power line EVDD, and a second electrode connected to an anode of the organic light-emitting diode OLED. The capacitor CST can have the first electrode connected to the gate electrode of the driving transistor DT and a second electrode connected to the anode of the organic light-emitting diode OLED. The organic light-emitting diode OLED can have the anode connected to the second electrode of the driving transistor DT and a cathode connected to the low-potential power line EVSS.

The switching transistor SW can have a gate electrode connected to the first gate line GL1, a first electrode connected to the first data line DL1, and a second electrode connected to the gate electrode of the driving transistor DT. The sensing transistor ST can have a gate electrode connected to the first gate line GL1, a first electrode connected to a first reference line REF1, and a second electrode connected to the anode of the organic light-emitting diode OLED.

The sensing transistor ST is a type of compensation circuit added to compensate for deterioration (threshold voltage, mobility, etc.) of the driving transistor DT or organic light-emitting diode OLED. The sensing transistor ST can enable physical sensing based on a source following operation of the driving transistor DT. The sensing transistor ST can operate to acquire a sensing voltage through a sensing node defined between the driving transistor DT and the organic light-emitting diode OLED.

Meanwhile, FIG. 8 illustrates and describes as an example that the switching transistor SW and the sensing transistor ST are commonly connected to one first gate line GL1 and turned on or off at the same time. However, these transistors can be separated to be connected to different gate lines, respectively.

The data driver 140 can include a panel driving circuit 141 for driving the subpixel SP and a panel sensing circuit 143 for sensing the subpixel SP. The panel driving circuit 141 can be connected to the first data line DL1, and the panel sensing circuit 143 can be connected to the first reference line REF1.

The panel driving circuit 141 can output a data voltage for driving the subpixel SP through the first data line DL1 during the display period DSP of FIG. 7. The panel sensing circuit 145 can acquire a sensing voltage for sensing the subpixel SP through the first reference line REF1 during the real-time sensing period RTS of FIG. 7.

The data driver 140 can transmit the sensing voltage to the timing controller, etc. The timing controller, etc. can generate a compensation value corresponding to deterioration (threshold voltage, mobility, etc.) of the driving transistor DT or organic light-emitting diode OLED based on the sensing voltage and compensate for the data signal, etc.

Meanwhile, the subpixel SP can form a touch electrode based on a transistor capable of separating the anode or the cathode of the organic light-emitting diode OLED. In addition, a touch electrode can be formed based on a transistor capable of grouping a plurality of subpixels SP into one. As such, various methods of forming a touch electrode for implementing a touch sensor in the display panel have been proposed. In order to avoid limiting the embodiment to a specific touch electrode structure, a part included in the touch electrode is not illustrated.

Figure 9:
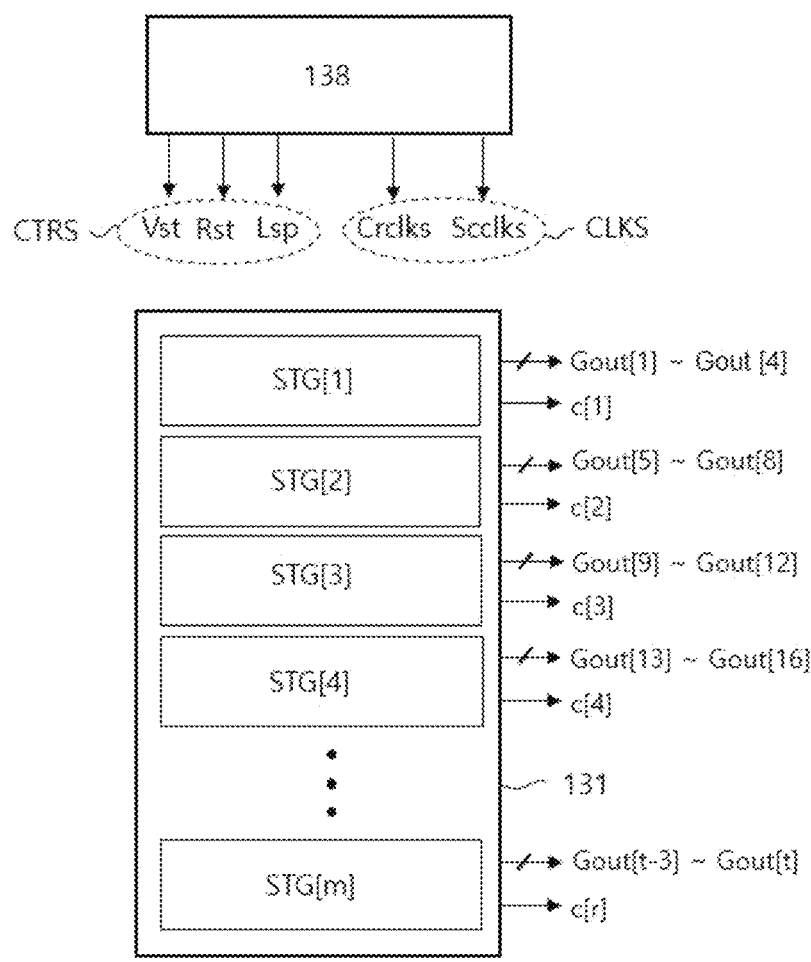
FIG. 9 is a block diagram illustrating a gate driver capable of outputting a multi-gate signal according to a first embodiment of the present disclosure.
Figure 10:
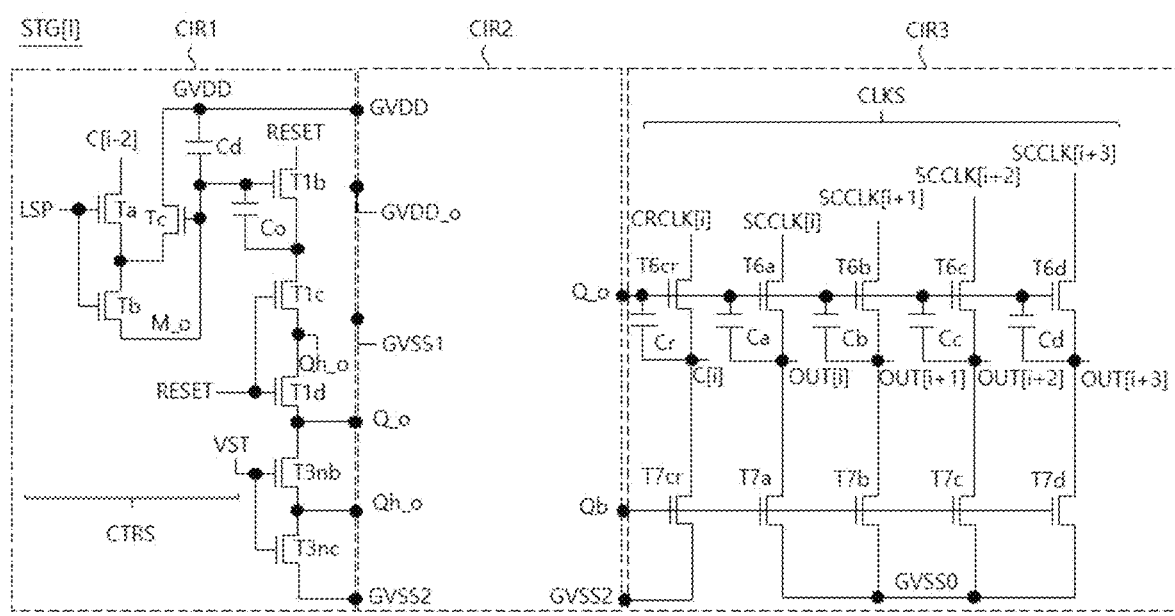
FIG. 10 is a circuit diagram illustrating a part of an Ith stage included in the gate driver according to the first embodiment.
Figure 11:
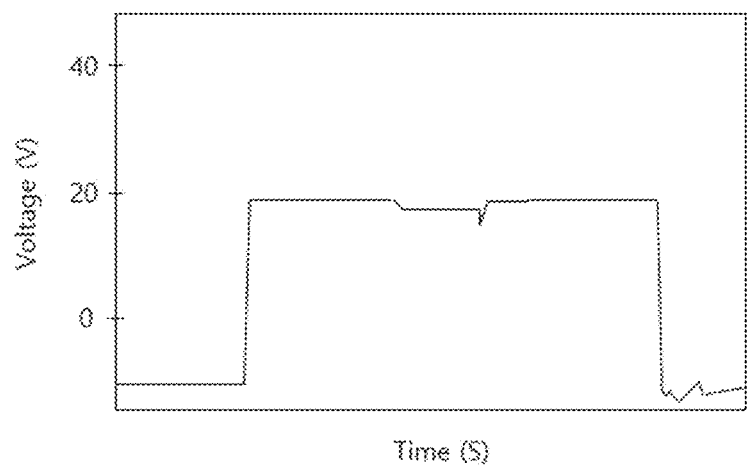
FIG. 11 is a diagram illustrating a voltage of an Mth node before the first embodiment is applied.
Figure 12:
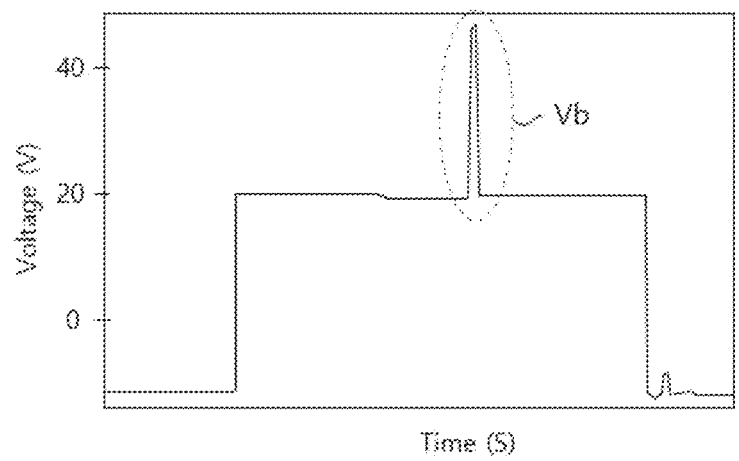
FIG. 12 is a diagram illustrating a voltage of the Mth node after the first embodiment is applied.

FIG. 9 is a block diagram illustrating a gate driver capable of outputting a multi-gate signal according to a first embodiment of the present disclosure, FIG. 10 is a circuit diagram illustrating a part of an Ith stage included in the gate driver according to the first embodiment, FIG. 11 is a diagram illustrating a voltage of an Mth node before the first embodiment is applied, and FIG. 12 is a diagram illustrating a voltage of the Mth node after the first embodiment is applied.

As illustrated in FIG. 9, according to the first embodiment, the gate driver capable of outputting a multi-gate signal can include a control signal output unit 138 and a shift register 131. Here, the shift register 131 illustrated in FIG. 9 can be at least one of the first shift register 131a or the second shift register 131b illustrated in FIG. 5.

The control signal output unit 138 can output a start signal Vst, a reset signal Rst, a selection signal Lsp, carry clock signals Crclks, scan clock signals Scclks, etc. under the control of the timing controller. Here, the start signal Vst, the reset signal Rst, and the selection signal Lsp can be included in a control signal group CTRS, and the carry clock signals Crclks and the scan clock signals Scclks can be included in a clock signal group CLKS.

The control signal output unit 138 can be included in a level shifter or a power supply, etc. depending on the implementation method of the LED device. In addition, at least one of signals output from the control signal output unit 138 can be directly output from the timing controller and applied to the shift register 131.

The shift register 131 can be disposed as stages STG[1] to STG[m] to output gate signals Gout[1] to Gout[t] and carry signals c[1] to c[r], where m, t, r and M can be real numbers such as positive integers. The stages STG[1] to STG[m] can have a dependent connection relationship so that operation can be performed in interconnection with an adjacent stage. The stages STG[1] to STG[m] can each output at least four gate signals and at least one carry signal. For example, the first stage STG1 can output four gate signals Gout[1] to Gout[4] and one carry signal c[1].

Meanwhile, note that the shift register 131 can further include a dummy stage around the first stage STG[1] and the M stage STG[m] to configure smooth output.

The shift register 131 can operate based on the start signal Vst, the reset signal Rst, the selection signal Lsp, the carry clock signals Crclks, the scan clock signals Scclks, etc. output from the control signal output unit 138, and can output the gate signals Gout[1] to Gout[t] and the carry signals c[1] to c[r]. Here, the gate signals Gout[1] to Gout[t] can be applied through the gate lines of the display panel, and the carry signals c[1] to c[r] can be applied to a start signal line (used as a start signal) of an adjacent stage.

The shift register 131 can be formed using a GIP method on a non-active area of the display panel through a thin film process performed when manufacturing the display panel. The shift register 131 can output the gate signals Gout[1] to Gout[t] and the carry signals c[1] to c[r] in a forward or reverse direction through the gate lines of the display panel.

As illustrated in FIGS. 9 and 10, according to the first embodiment, the Ith stage (STG[I]) included in the gate driver can include a first circuit CIR1, a second circuit CIR2, and a third circuit CIR3. The first circuit CIR1, the second circuit CIR2, and the third circuit CIR3 can be implemented based on n-type transistors turned on based on a high voltage.

The first circuit CIR1 serves to control the second circuit CIR2 based on the start signal Vst, the reset signal Rst, and the selection signal Lsp, and thus can be defined as an operation control circuit. The second circuit CIR2 serves to control a first node Q_o, a second node Qh_o, and a third node Qb in response to an operation of the first circuit CIR1, and thus can be defined as a node control circuit. The third circuit CIR3 serves to output carry signals and gate signals based on the carry clock signals Crclks and the scan clock signals Scclks in response to an operation of the second circuit CIR2, and thus can be defined as an output control circuit.

The first circuit CIR1 can include a first transistor Ta, a second transistor Tb, a third transistor Tc, a first capacitor Cd, a second capacitor Co, a fourth transistor T1b, a fifth transistor T1c, a sixth transistor T1d, a seventh transistor T3nb, and an eighth transistor T3nc.

The first transistor Ta can have a gate electrode connected to a selection signal line LSP through which the selection signal Lsp is applied, a first electrode connected to an (I−2)th carry signal output terminal C[i−2] (a carry signal output terminal of a stage located two stages before a current stage) where an (I−2)th carry signal is output, and a second electrode connected to a first electrode of the second transistor Tb and a first electrode of the third transistor Tc. The first transistor Ta is turned on based on the selection signal Lsp and can serve to transmit the (I−2)th carry signal to a node to which the first electrode of the second transistor Tb and the first electrode of the third transistor Tc are connected.

The second transistor Tb can have a gate electrode connected to the selection signal line LSP, the first electrode connected to the first electrode of the third transistor Tc and the second electrode of the first transistor Ta, and a second electrode connected to an Mth node M_o. The second transistor Tb is turned on based on the selection signal Lsp and can serve to transmit the (I−2)th carry signal to the Mth node M_o. The Mth node M_o can be charged or discharged in response to a potential of the (I−2)th carry signal transmitted from the second transistor Tb.

The third transistor Tc can have a gate electrode connected to the Mth node M_o, the first electrode connected to the first electrode of the second transistor Tb and the second electrode of the first transistor Ta, and a second electrode connected to the first high-voltage line GVDD through which a first high voltage is applied. The third transistor Tc is turned on based on the potential of the Mth node M_o, and can serve to transmit the first high voltage applied through the first high-voltage line GVDD to a node to which the first electrode of the second transistor Tb and the second electrode of the first transistor Ta are connected.

The first capacitor Cd can have a first electrode connected to the first high-voltage line GVDD and a second electrode connected to the gate electrode of the third transistor Tc, the first electrode of the second capacitor Co, and a gate electrode of the fourth transistor T1b. The first capacitor Cd can serve to stably maintain a potential stored in the Mth node M_o based on the first high voltage.

The second capacitor Co can have a first electrode connected to the Mth node M_o, to which the gate electrode of the fourth transistor T1$b$ is connected, and a second electrode connected to a second electrode of the fourth transistor T1$b$ and a first electrode of the fifth transistor T1$c$. The second capacitor Co can serve to prevent deterioration of charging characteristics due to a change in a signal applied through the first electrode of the fourth transistor T1$b$. Accordingly, the second capacitor Co can be defined as a compensation capacitor, and a description related thereto will be given below.

The fourth transistor T1$b$ can have a gate electrode connected to the Mth node M_o, the first electrode connected to the reset signal line RESET to which the reset signal Rst is applied, and a second electrode connected to the second electrode of the second capacitor Co and the first electrode of the fifth transistor T1$c$. The fourth transistor T1$b$ is turned on based on a potential of the Mth node M_o and can serve to transmit the reset signal Rst to the first electrode of the fifth transistor T1$c$. The fourth transistor T1$b$ can be defined as a first reset transistor.

The fifth transistor T1$c$ can have a gate electrode connected to the reset signal line RESET, the first electrode connected to the second electrode of the fourth transistor T1$b$, and a second electrode connected to the second node Qh_o and a first electrode of the sixth transistor T1$d$. The fifth transistor T1$c$ is turned on based on the reset signal Rst and can serve to transmit the reset signal Rst applied through the fourth transistor T1$b$ to the second node Qh_o.

The sixth transistor T1$d$ can have a gate electrode connected to the reset signal line RESET, the first electrode connected to the second node Qh_o and the second electrode of the fifth transistor T1$c$, and a second electrode connected to the first node Q_o and a first electrode of the seventh transistor T3$nb$. The sixth transistor T1$d$ is turned on based on the reset signal Rst and can serve to connect the first node Q_o and the second node Qh_o. The fifth transistor T1$c$ and the sixth transistor T1$d$ can be defined as a second reset transistor group.

The seventh transistor T3$nb$ can have a gate electrode connected to the start signal line VST to which the start signal Vst is applied, the first electrode connected to the first node Q_o, and a second electrode connected to the second node Qh_o and a first electrode of the eighth transistor T3$nc$. The seventh transistor T3$nb$ is turned on based on the start signal Vst and can serve to connect the first node Q_o and the second node Qh_o.

The eighth transistor T3$nc$ can be a gate electrode connected to the start signal line VST, the first electrode connected to the second node Qh_o and the second electrode of the seventh transistor T3$nb$, and a second electrode connected to a third low-voltage line GVSS2 to which a third low voltage is applied. The eighth transistor T3$nc$ is turned on based on the start signal Vst and can serve to transmit the third low voltage to the second node Qh_o.

The second circuit CIR2 can include transistors configured to control the first node Q_o, the second node Qh_o, and the third node Qb based on an operation of the first circuit CIR1. The second circuit CIR2 can control the first node Q_o, the second node Qh_o, and the third node Qb based on the second high voltage applied through the second high-voltage line GVDD_o, the second low voltage applied through the second low-voltage line GVSS1, and the third low voltage applied through the third low-voltage line GVSS2 in addition to the operation of the first circuit CIR1.

The second circuit CIR2 can be implemented in various forms for efficient and stable control of the node, and thus a configuration related thereto is omitted in the first embodiment.

The third circuit CIR3 can include a first carry pull-up transistor T6$cr$, a first carry pull-down transistor T7$cr$, a first carry capacitor Cr, a first output pull-up transistor T6$a$, a second output pull-up transistor T6$b$, a third output pull-up transistor T6$c$, a fourth output pull-up transistor T6$d$, a first output pull-down transistor T7$a$, a second output pull-down transistor T7$b$, a third output pull-down transistor T7$c$, a fourth output pull-down transistor T7$d$, a first output capacitor Ca, a second output capacitor Cb, a third output capacitor Cc, and a fourth output capacitor Cd. The third circuit CIR3 can output one carry signal and four gate signals.

The first carry pull-up transistor T6$cr$ can have a gate electrode connected to the first node Q_o and a first electrode of the first carry capacitor Cr, a first electrode connected to an Ith carry clock signal line CRCLK[i] to which an Ith carry clock signal is applied, and a second electrode connected to a second electrode of the first carry capacitor Cr and an Ith carry output terminal C[i]. The first carry pull-up transistor T6$cr$ is turned on based on a potential of the first node Q_o and can serve to output an Ith carry signal at a high voltage based on the Ith carry clock signal.

The first carry pull-down transistor T7$cr$ can have a gate electrode connected to the third node Qb, a first electrode connected to the third low-voltage line GVSS2 to which the third low voltage is applied, and a second electrode connected to the Ith carry output terminal C[i]. The first carry pull-down transistor T7$cr$ is turned on based on a potential of the third node Qb and can output an Ith carry signal at a low voltage based on the third low voltage.

The first output pull-up transistor T6$a$ can have a gate electrode connected to the first node Q_o and a first electrode of the first output capacitor Ca, a first electrode connected to an Ith scan clock signal line SCCLK[i] to which an Ith scan clock signal is applied, and a second electrode connected to a second electrode of the first output capacitor Ca and an Ith gate output terminal OUT[i]. The first output pull-up transistor T6$a$ is turned on based on a potential of the first node Q_o and can output an Ith gate signal at a high voltage based on the Ith scan clock signal.

The first output pull-down transistor T7$a$ can have a gate electrode connected to the third node Qb, a first electrode connected to a first low-voltage line GVSS0 to which the first low voltage is applied, and a second electrode connected to the Ith gate output terminal OUT[i]. The first output pull-down transistor T7$a$ is turned on based on a potential of the third node Qb and can serve to output an Ith gate signal at a low voltage based on the first low voltage.

The second output pull-up transistor T6$b$ can have a gate electrode connected to the first node Q_o and a first electrode of the second output capacitor Cb, a first electrode connected to an (I+1)th scan clock signal line SCCLK[i+1] to which an (I+1)th scan clock signal is applied, and a second electrode connected to a second electrode of the second output capacitor Cb and an (I+1)th gate output terminal OUT[i+1]. The second output pull-up transistor T6$b$ is turned on based on a potential of the first node Q_o and can serve to output an (I+1)th gate signal at a high voltage based on the (I+1)th scan clock signal.

The second output pull-down transistor T7$b$ can have a gate electrode connected to the third node Qb, a first electrode connected to the first low-voltage line GVSS0 to which the first low voltage is applied, and a second electrode connected to the (I+1)th gate output terminal OUT[i+1]. The second output pull-down transistor T7b is turned on based on a potential of the third node Qb and can serve to output an (I+1)th gate signal at a low voltage based on the first low voltage.

The third output pull-up transistor T6c can have a gate electrode connected to the first node Q_o and a first electrode of the third output capacitor Cc, a first electrode connected to an (I+2)th scan clock signal line SCCLK[i+2] to which an (I+2)th scan clock signal is applied, and a second electrode connected to a second electrode of the third output capacitor Cc and an (I+2)th gate output terminal OUT[i+2]. The third output pull-up transistor T6c is turned on based on a potential of the first node Q_o and can serve to output an (I+2)th gate signal at a high voltage based on the (I+2)th scan clock signal.

The third output pull-down transistor T7c can have a gate electrode connected to the third node Qb, a first electrode connected to the first low-voltage line GVSS0 to which the first low voltage is applied, and a second electrode connected to the (I+2)th gate output terminal OUT[i+2]. The third output pull-down transistor T7c is turned on based on a potential of the third node Qb and can serve to output an (I+2)th gate signal at a low voltage based on the first low voltage.

The fourth output pull-up transistor Tod can have a gate electrode connected to the first node Q_o and a first electrode of the fourth output capacitor Cd, a first electrode connected to an (I+3)th scan clock signal line SCCLK[i+3] to which an (I+3)th scan clock signal is applied, and a second electrode connected to a second electrode of the fourth output capacitor Cd and an (I+3)th gate output terminal OUT[i+3]. The fourth output pull-up transistor T6d is turned on based on a potential of the first node Q_o and can serve to output an (I+3)th gate signal at a high voltage based on the (I+3)th scan clock signal.

The fourth output pull-down transistor T7d can have a gate electrode connected to the third node Qb, a first electrode connected to the first low-voltage line GVSS0 to which the first low voltage is applied, and a second electrode connected to the (I+3)th gate output terminal OUT[i+3]. The fourth output pull-down transistor T7d is turned on based on a potential of the third node Qb and can serve to output an (I+3)th gate signal at a low voltage based on the first low voltage.

Meanwhile, in the above description, the first high-voltage line GVDD and the second high-voltage line GVDD_o are each physically separated, but can be arranged and set so that high voltages having the same or different levels are applied depending on the performance or operating characteristics of the circuit. In addition, in the above description, the first low-voltage line GVSS0, the second low-voltage line GVSS1, and the third low-voltage line GVSS2 are each physically separated, but can be arranged and set so that at least one low voltage having the same or different levels is applied depending on the performance or operating characteristics of the circuit.

FIG. 11 is a gate driver (experimental example) to which the first embodiment is not applied, and does not include the second capacitor Co. In contrast, FIG. 12 is a gate driver (embodiment) to which the first embodiment is applied and includes the second capacitor Co.

As can be seen by referring to the simulation results of FIGS. 11 and 12, in the experimental example to which the first embodiment is not applied, the Mth node is charged with a voltage of about 20 V. However, in the example to which the first embodiment is applied, in addition to being charged with a voltage of about 20 V, the Mth node can be further charged with a voltage of about 45 V. Here, as can be seen with reference to Vb of FIG. 12, a charging voltage of about 45 V is due to the bootstrapping effect by the second capacitor Co.

In this way, the gate driver (embodiment) to which the first embodiment is applied can induce charging of the Mth node with a high voltage which is relatively high, and thus can prevent deterioration in charging characteristics due to change of a signal applied through the first electrode of the fourth transistor T1b to a pulse form or an alternating current form rather than a direct current form.

Figure 13:
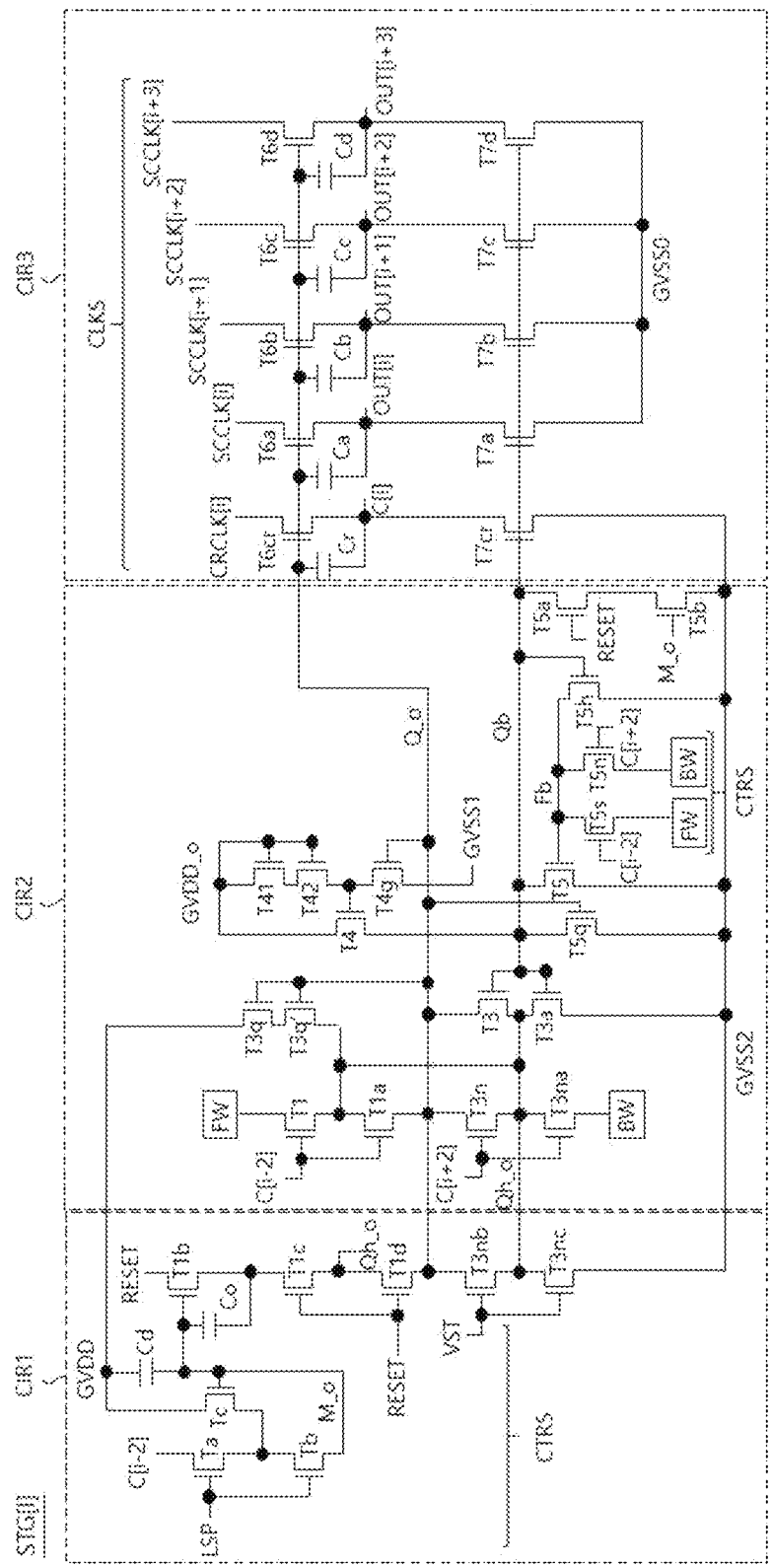
FIG. 13 is a circuit diagram including and illustrating in more detail a part of an Ith stage included in a gate driver according to a second embodiment of the present disclosure.
Figure 14:
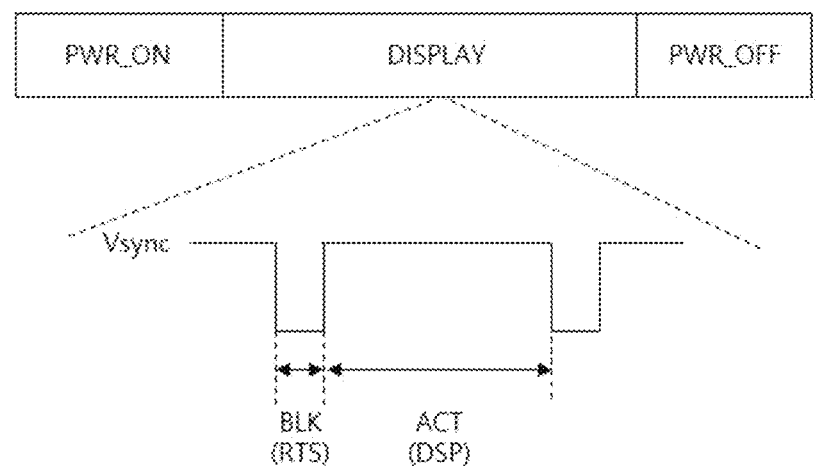
FIGS. 14 and 15 are driving waveform diagrams each for describing a part of an operation of the gate driver including a shift register according to the second embodiment.
Figure 15:
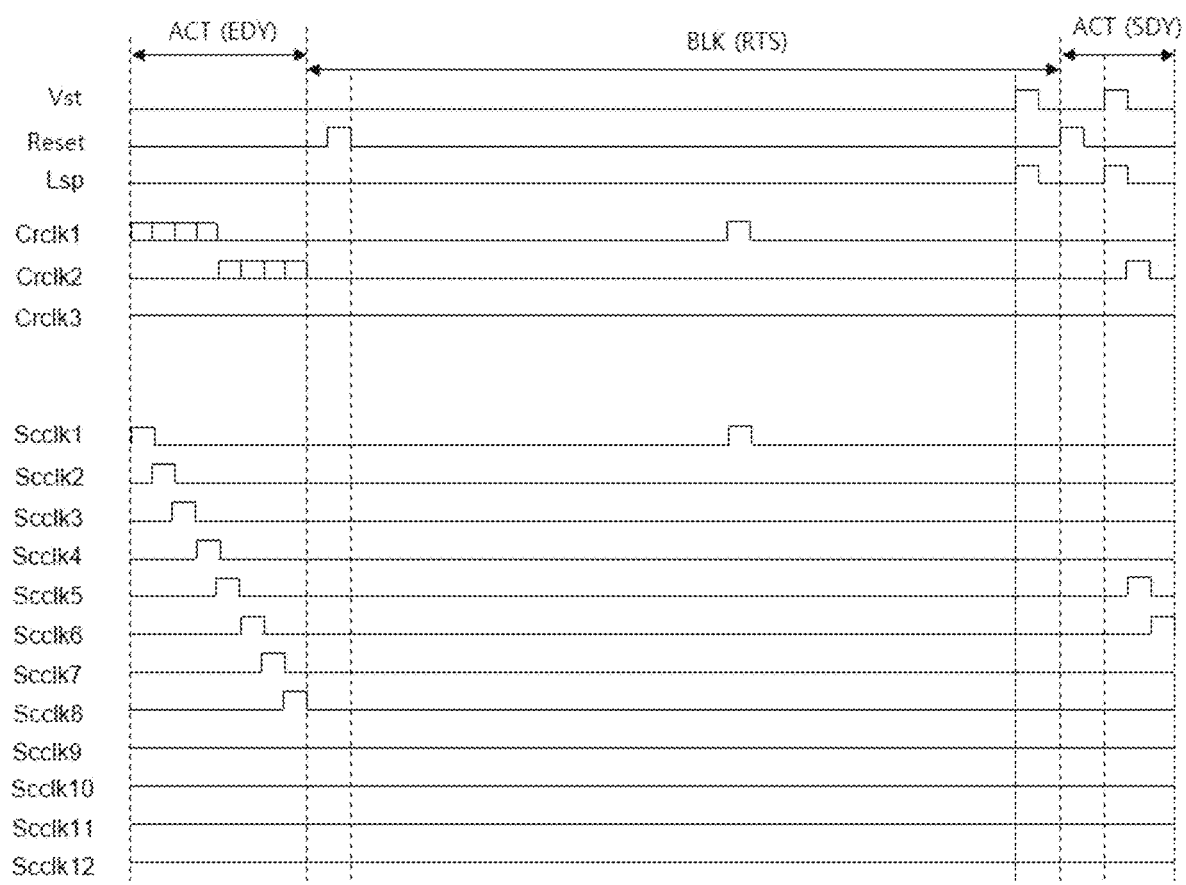
Figure 16:
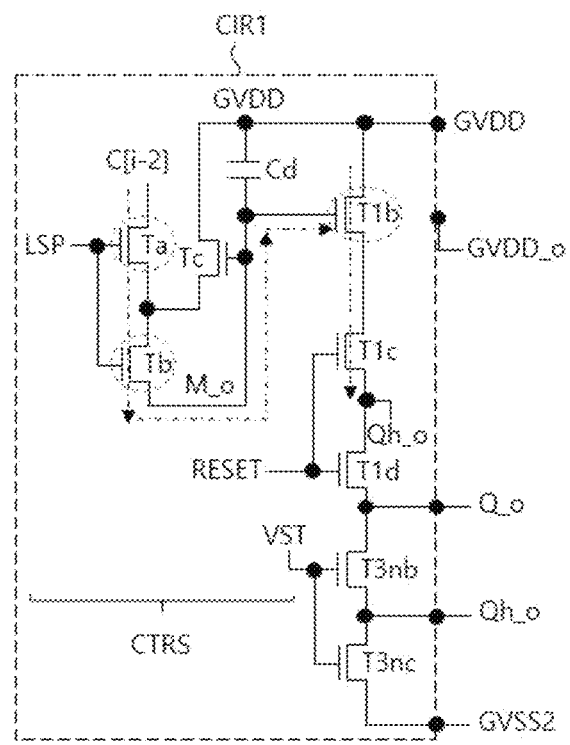
FIGS. 16 and 17 are diagrams illustrating a configuration of a first circuit and a voltage of an Mth node before the second embodiment is applied.
Figure 17:
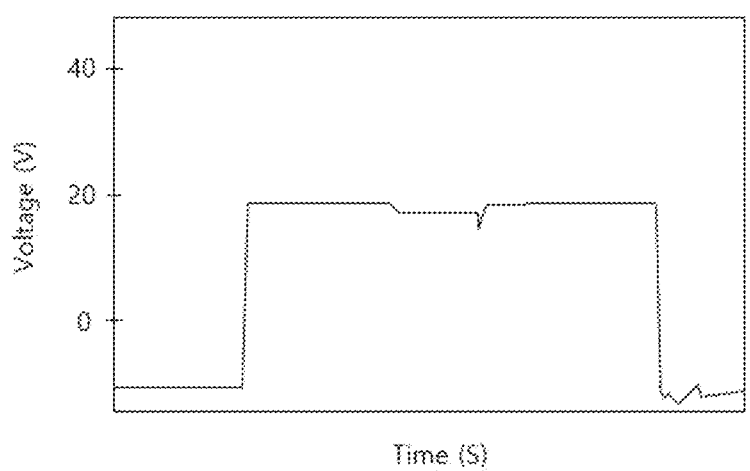
Figure 18:
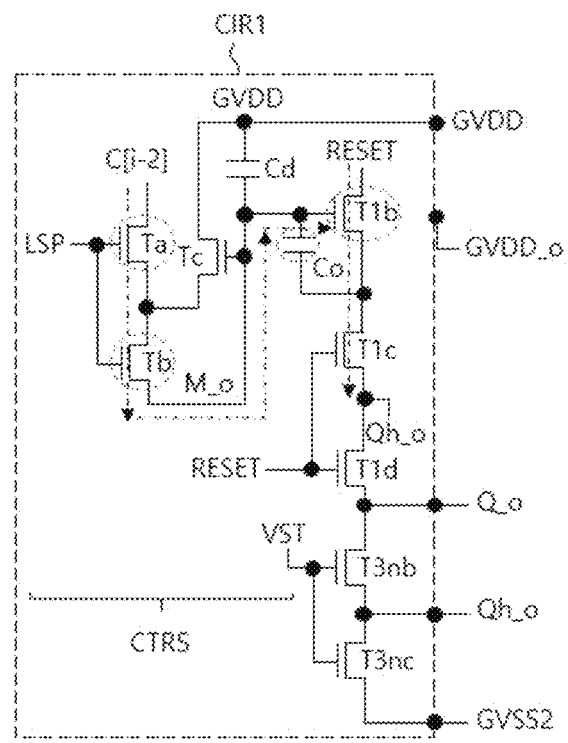
FIGS. 18 and 19 are diagrams illustrating a configuration of the first circuit and a voltage of the Mth node after the second embodiment is applied.
Figure 19:
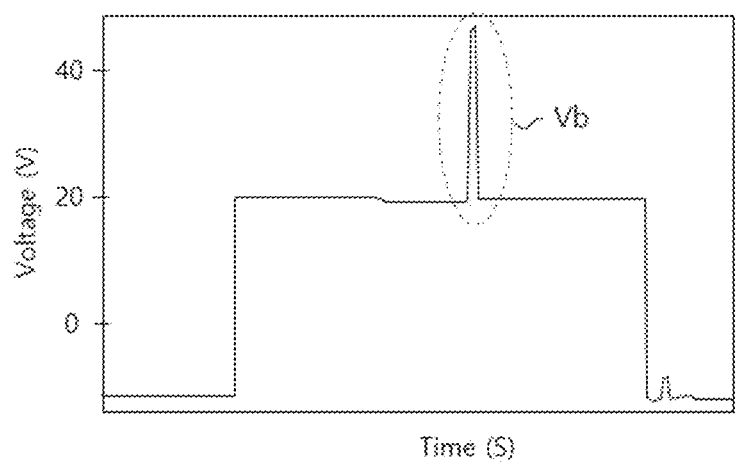

FIG. 13 is a circuit diagram including and illustrating in more detail a part of an Ith stage included in a gate driver according to a second embodiment of the present disclosure, FIGS. 14 and 15 are driving waveform diagrams each for describing a part of an operation of the gate driver including a shift register according to the second embodiment, FIGS. 16 and 17 are diagrams illustrating a configuration of a first circuit and a voltage of an Mth node before the second embodiment is applied, and FIGS. 18 and 19 are diagrams illustrating a configuration of the first circuit and a voltage of the Mth node after the second embodiment is applied.

The second embodiment described below is similar to the first embodiment except that a configuration of a second circuit is shown in more detail as an example. Therefore, the following will mainly describe parts shown in detail and operations of parts related thereto compared to the first embodiment, and thus parts not described will be understood with reference to the first embodiment.

As illustrated in FIGS. 9 and 13, according to the second embodiment, the Ith stage STG[I] included in the gate driver can include a first circuit CIR1, a second circuit CIR2, and a third circuit CIR3. The first circuit CIR1, the second circuit CIR2, and the third circuit CIR3 can be implemented based on n-type transistors, etc. turned on based on high voltages. The first circuit CIR1 serves to control the second circuit CIR2 based on the start signal Vst, the reset signal Rst, and the selection signal Lsp, and thus can be defined as an operation control circuit. The second circuit CIR2 serves to control the first node Q_o, the second node Qh_o, and the third node Qb in response to an operation of the first circuit CIR1, and thus can be defined as a node control circuit. The third circuit CIR3 serves to output carry signals and gate signals based on the carry clock signals Crclks and the scan clock signals Scclks in response to an operation of the second circuit CIR2, and thus can be defined as an output control circuit.

The first circuit CIR1 can include a first transistor Ta, a second transistor Tb, a third transistor Tc, a first capacitor Cd, a second capacitor Co, a fourth transistor T1b, a fifth transistor T1c, a sixth transistor T1d, a seventh transistor T3nb, and an eighth transistor T3nc. A connection relationship of the elements included in the first circuit CIR1 is understood with reference to the first embodiment.

The second circuit CIR2 can include a first control transistor T1, a second control transistor T1a, a third control transistor T3n, a fourth control transistor T3na, a fifth control transistor T3q, a sixth control transistor T3q', a seventh control transistor T3, an eighth control transistor T3a, a ninth control transistor T4, a tenth control transistor T41, a eleventh control transistor T42, a twelfth control transistor T4g, a thirteenth control transistor T5q, a fourteenth control transistor T5, a fifteenth control transistor T5s, a sixteenth control transistor T5n, a seventeenth control transistor T5h, an eighteenth control transistor T5a, and a nineteenth control transistor T5b.

The first control transistor T1 can have a gate electrode connected to an (I−2)th carry signal output terminal C[i−2] (a carry signal output terminal of a stage located two stages before a current stage) where an (I−2)th carry signal is output, a first electrode connected to a forward signal line FW to which a forward signal is applied, and a second electrode connected to the second node Qh_o. The first control transistor T1 is turned on based on the (I−2)th carry signal and can serve to transmit a forward signal to the second node Qh_o.

The second control transistor T1a can have a gate electrode connected to the (I−2)th carry signal output terminal C[i−2] where the (I−2)th carry signal is output, a first electrode connected to the second node Qh_o, and a second electrode connected to the first node Q_o. The second control transistor T1a is turned on based on the (I−2)th carry signal, and can serve to connect the second node Qh_o and the first node Q_o to each other.

The third control transistor T3n can have a gate electrode connected to the (I+2)th carry signal output terminal C[i+2] (a carry signal output terminal of a stage located two stages after a current stage) where the (I+2)th carry signal is output, a first electrode connected to the first node Q_o, and a second electrode connected to the second node Qh_o. The third control transistor T3n is turned on based on the (I+2)th carry signal and can serve to connect the first node Q_o and the second node Qh_o to each other.

The fourth control transistor T3na can have a gate electrode connected to the (I+2)th carry signal output terminal C[i+2] where the (I+2)th carry signal is output, a first electrode connected to a backward signal line BW to which a backward signal is applied, and a second electrode connected to the second node Qh_o. The fourth control transistor T3na is turned on based on the (I+2)th carry signal and can serve to transmit the backward signal to the second node Qh_o.

The fifth control transistor T3q can have a gate electrode connected to the first node Q_o, a first electrode connected to the first high-voltage line GVDD, and a second electrode connected to a first electrode of the sixth control transistor T3q'. The fifth control transistor T3q is turned on based on a potential of the first node Q_o and can serve to transmit the first high voltage to the first electrode of the sixth control transistor T3q'.

The sixth control transistor T3q' can have a gate electrode connected to the first node Q_o, the first electrode connected to the first high-voltage line GVDD and to the second electrode of the fifth control transistor T3q, and a second electrode connected to the second node Qh_o. The sixth control transistor T3q' is turned on based on a potential of the first node Q_o and can serve to transmit the first high voltage transmitted from the fifth control transistor T3q to the second node Qh_o.

The seventh control transistor T3 can have a gate electrode connected to the third node Qb, a first electrode connected to the first node Q_o, and a second electrode connected to the second node Qh_o. The seventh control transistor T3 is turned on based on a potential of the third node Qb and can serve to connect the first node Q_o and the second node Qh_o to each other.

The eighth control transistor T3a can have a gate electrode connected to the third node Qb, a first electrode connected to the third low-voltage line GVSS2, and a second electrode connected to the second node Qh_o. The eighth control transistor T3a is turned on based on a potential of the third node Qb and can serve to transmit the third low voltage to the second node Qh_o.

The ninth control transistor T4 can have a gate electrode connected to a second electrode of the eleventh control transistor T42 and a first electrode of the twelfth control transistor T4g, a first electrode connected to the second high-voltage line GVDD_o to which the second high voltage is applied, and a second electrode connected to the third node Qb. The ninth control transistor T4 is turned on based on a potential of a node to which the second electrode of the eleventh control transistor T42 and the first electrode of the twelfth control transistor T4g are connected and can serve to transmit the second high voltage to the third node Qb.

The tenth control transistor T41 can have a gate electrode and a first electrode connected to the second high-voltage line GVDD_o and a second electrode connected to a first electrode of the eleventh control transistor T42. The tenth control transistor T41 is turned on based on the second high voltage and can serve to transmit the second high voltage to the first electrode of the eleventh control transistor T42.

The eleventh control transistor T42 can have a gate electrode connected to the second high-voltage line GVDD_o, the first electrode connected to a second electrode of the tenth control transistor T41, and the second electrode connected to the gate electrode of the ninth control transistor T4 and the first electrode of the twelfth control transistor T4g. The eleventh control transistor T42 is turned on based on the second high voltage and can serve to transmit the second high voltage transmitted from the tenth control transistor T41 to the gate electrode of the ninth control transistor T4 and the first electrode of the twelfth control transistor T4g.

The twelfth control transistor T4g can have a gate electrode connected to the first node Q_o, the first electrode connected to the second low-voltage line GVSS1 to which the second low-potential voltage is applied, and a second electrode connected to the second electrode of the eleventh control transistor T42 and the gate electrode of the ninth control transistor T4. The twelfth control transistor T4g is turned on based on a potential of the first node Q_o and can serve to transmit the second low-potential voltage to the second electrode of the eleventh control transistor T42 and the gate electrode of the ninth control transistor T4.

The thirteenth control transistor T5q can have a gate electrode connected to the first node Q_o, a first electrode connected to the third low-voltage line GVSS2, and a second electrode connected to the third node Qb. The thirteenth control transistor T5q is turned on based on a potential of the first node Q_o and can serve to transmit the third low voltage to the third node Qb.

The fourteenth control transistor T5 can have a gate electrode connected to a fourth node Fb, a first electrode connected to the third low-voltage line GVSS2, and a second electrode connected to the third node Qb. The fourteenth control transistor T5 is turned on based on a potential of the fourth node Fb and can serve to transmit the third low voltage to the third node Qb.

The fifteenth control transistor T5s can have a gate electrode connected to the (I−2)th carry signal output terminal C[i−2], a first electrode connected to the forward signal line FW, and a second electrode connected to the fourth node Fb. The fifteenth control transistor T5s is turned on based on the (I−2)th carry signal and can serve to transmit the forward signal to the fourth node Fb.

The sixteenth control transistor T5n can have a gate electrode connected to the (I+2)th carry signal output terminal C[i+2], a first electrode connected to the backward signal line BW, and a second electrode connected to the fourth node Fb. The sixteenth control transistor T5n is turned on based on the (I–2)th carry signal and can serve to transmit the backward signal to the fourth node Fb.

The seventeenth control transistor T5h can have a gate electrode connected to the third node Qb, a first electrode connected to the third low-voltage line GVSS2, and a second electrode connected to the fourth node Fb. The seventeenth control transistor T5h is turned on based on a potential of the third node Qb and can serve to transmit the third low voltage to the fourth node Fb.

The eighteenth control transistor T5a can have a gate electrode connected to the reset signal line RESET, a first electrode connected to the third node Qb, and a second electrode connected to a second electrode of the nineteenth control transistor T5b. The eighteenth control transistor T5a is turned on based on the reset signal and can serve to transmit the third low voltage transmitted from the nineteenth control transistor T5b to the third node Qb. The eighteenth control transistor T5a can be defined as a third reset transistor.

The nineteenth control transistor T5b can have a gate electrode connected to the Mth node M_o, a first electrode connected to the third low voltage line GVSS2, and the second electrode connected to the second electrode of the eighteenth control transistor T5a. The nineteenth control transistor T5b is turned on based on a potential of the Mth node M_o and can serve to transmit the third low voltage to the second electrode of the eighteenth control transistor T5a.

Meanwhile, in the above description, by way of example, the second circuit CIR2 includes a circuit capable of setting an output order of the gate signals Gout[1] to Gout[m]. The circuit capable of setting the output order of the gate signals can control the shift register so that the shift register operates in forward order from the first stage STG[1] to the Mth stage STG[m] in response to the forward signal. In addition, the circuit capable of setting the output order of the gate signals can control the shift register so that the shift register operates in reverse order from the Mth stage STG[m] to the first stage STG[1] in response to the backward signal. However, this is only an example, and the circuit capable of setting an output direction can be omitted.

The third circuit CIR3 can include a first carry pull-up transistor T6cr, a first carry pull-down transistor T7cr, a first carry capacitor Cr, a first output pull-up transistor T6a, a second output pull-up transistor T6b, a third output pull-up transistor T6c, a fourth output pull-up transistor T6d, a first output pull-down transistor T7a, a second output pull-down transistor T7b, a third output pull-down transistor T7c, a fourth output pull-down transistor T7d, a first output capacitor Ca, a second output capacitor Cb, a third output capacitor Cc, and a fourth output capacitor Cd. The third circuit CIR3 can output one carry signal and four gate signals. A connection relationship of the elements included in the third circuit CIR3 is understood with reference to the first embodiment.

As illustrated in FIG. 14, the gate driver according to the second embodiment can implement separate operation methods in response to a first period PWR_ON, a second period DISPLAY, and a third period PWR_OFF, respectively, when operating to drive the display panel.

The first period PWR_ON can correspond to a driving start period in which power is applied to the display panel, the second period DISPLAY can correspond to a panel driving period in which driving such as displaying an image is performed after power is applied to the display panel, and the third period PWR_OFF can correspond to a driving end period in which power applied to the display panel is cut off.

The gate driver according to the second embodiment can drive the display panel separately for each period even in the second period DISPLAY based on a vertical synchronization signal Vsync, etc. For example, a blank period BLK included in the vertical synchronization signal Vsync can be defined as a real-time sensing period RTS. Further, an active period ACT included in the vertical synchronization signal Vsync can be defined as a display period DSP (for convenience of description, the touch sensing period is omitted).

As illustrated in FIGS. 13, 14, and 15, the gate driver according to the second embodiment can receive a reset signal Reset during an initial part of the blank period BLK. Further, at least one of the scan clock signals Scclk1 to Scclk12 and at least one of the carry clock signals Crclk1 to Crclk3 can be applied during a middle part of the blank period BLK. Further, the start signal Vst and the selection signal Lsp can be received during a latter part of the blank period BLK.

Meanwhile, FIG. 15 illustrates an example in which the first scan clock signal Scclk1 and the corresponding first carry clock signal Crclk1 are applied as high voltages. However, note that this can vary depending on the way in which real-time sensing is performed, and thus only two representative clock signals are illustrated.

In addition, FIG. 15 illustrates an example in which the reset signal Reset is applied and then the start signal Vst and the selection signal Lsp are applied during an early part SDY of the active period ACT, and the first to eighth scan clock signals Scclk1 to Scclk8 and the first and second carry clock signals Crclk1 to Crclk2 are generated in a non-overlapping manner during a late part EDY of the active period ACT. However, note that, since this can vary depending on the configuration and driving method of the gate driver, the signals are representatively illustrated as being generated in a non-overlapping manner.

As illustrated in FIGS. 16 and 17, the gate driver (experimental example) to which the second embodiment is not applied does not include the second capacitor Co and can have a structure in which the first electrode of the fourth transistor T1b is connected to the first high-voltage line GVDD.

In the gate driver to which the second embodiment is not applied, when the Mth node M_o is charged by the turned-on first transistor Ta and second transistor Tb, a first high voltage of a direct current form is continuously applied to the fourth transistor T1b, and thus a time of exposure to stress can be prolonged.

As illustrated in FIGS. 18 and 19, the gate driver (embodiment) to which the second embodiment is applied includes the second capacitor Co, and can have a structure in which the first electrode of the fourth transistor T1b is connected to the reset signal line RESET.

In the gate driver to which the second embodiment is applied, when the Mth node M_o is charged by the turned-on first transistor Ta and second transistor Tb, a pulse-form or alternating current-form reset signal is intermittently applied to the fourth transistor T1b, so that a time of exposure to stress can be drastically shortened compared to the experimental example.

In addition, as can be seen by referring to the simulation results of FIGS. 17 and 19, while the Mth node is charged with a voltage of about 20 V in the experimental example to which the second embodiment is not applied, the Mth node can be charged with a voltage of about 20 V and can further be charged with a voltage of about 45 V in the example to which the second embodiment is applied. Here, as can be seen with reference to Vb of FIG. 19, the charging voltage of about 45 V is due to the bootstrapping effect by the second capacitor Co (compensation capacitor).

In this way, the gate driver (embodiment) to which the second embodiment is applied can induce charging of the Mth node M_o with a high voltage which is relatively high, and thus it is possible to prevent deterioration in charging characteristics due to change of a signal applied through the first electrode of the fourth transistor T1b to a pulse form or an alternating current form rather than a direct current form.

Therefore, the gate driver to which the second embodiment is applied may not only relieve a problem of shifting of the threshold voltage of the fourth transistor T1b, but also prevent a problem of deterioration of charging characteristics even when an input signal is changed to a pulse form or an alternating current form rather than a direct current form, and thus can improve driving stability and driving reliability.

As mentioned above, the present disclosure has an effect of being able to provide a gate driving circuit that may not only relieve a problem of shifting of a threshold voltage of a transistor by changing an input signal to a pulse form or an alternating current form rather than a direct current form, but also prevent a problem of deterioration of charging characteristics caused by changing an input signal to a pulse form or alternating current form, thereby improving driving stability and driving reliability. In addition, the present disclosure has an effect of being able to improve a lifespan of a display device based on the gate driving circuit that can improve driving stability and driving reliability.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device comprising:
    a display panel configured to display an image; and
    a gate driver having stages, each of the stages including a first circuit, a second circuit, and a third circuit to generate gate signals for driving the display panel,
    wherein the first circuit controls the second circuit based on a start signal, a reset signal, and a selection signal,
    the second circuit controls a first node, a second node, and a third node in response to an operation of the first circuit,
    the third circuit outputs a carry signal and the gate signals based on a carry clock signal and scan clock signals in response to an operation of the second circuit, and
    the first circuit comprises:
    a first reset transistor configured to turn on based on a potential of an Mth node to output the reset signal applied through a first electrode through a second electrode, where M is a real number;
    a compensation capacitor having a first electrode connected to a gate electrode of the first reset transistor, and a second electrode connected to the second electrode of the first reset transistor;
    a first transistor configured to turn on based on the selection signal to output an (I–2)th carry signal applied through a first electrode through a second electrode, where I is a real number;
    a second transistor configured to turn on based on the selection signal to transmit the (I–2)th carry signal to the Mth node;
    a third transistor configured to turn on based on a potential of the Mth node to transmit a first high voltage applied through a first high-voltage line to a node to which a first electrode of the second transistor and the second electrode of the first transistor are connected; and
    a fourth transistor defined as the first reset transistor configured to turn on based on the potential of the Mth node to output the reset signal applied through the first electrode through the second electrode.

2. The display device according to claim 1, wherein the reset signal is applied in a pulse form.

3. The display device according to claim 1, wherein the reset signal is applied in a pulse form once during each of a blank period and an active period.

4. The display device according to claim 1, wherein the first circuit further comprises:
    a fifth transistor configured to turn on based on the reset signal to transmit the reset signal applied through the fourth transistor to the second node;
    a sixth transistor configured to turn on based on the reset signal to electrically connect the first node and the second node to each other;
    a seventh transistor configured to turn on based on the start signal to connect the first node and the second node to each other; and
    an eighth transistor configured to turn on based on the start signal to transmit a low voltage to the second node.

5. The display device according to claim 1, wherein
    the first transistor includes a gate electrode connected to a selection signal line to which the selection signal is applied, and a first electrode connected to an (I–2)th carry signal output terminal through which an (I–2)th carry signal is output;
    the second transistor includes a gate electrode connected to the selection signal line, a first electrode connected to a second electrode of the first transistor, and a second electrode connected to the Mth node;
    the third transistor includes a gate electrode connected to the Mth node, a first electrode connected to the first electrode of the second transistor and the second electrode of the first transistor, and a second electrode connected to a first high-voltage line to which the first high voltage is applied; and
    the fourth transistor includes a gate electrode connected to the Mth node, a first electrode connected to a reset signal line to which the reset signal is applied, and a second electrode connected to the second electrode of the compensation capacitor.

6. The display device according to claim 5, wherein the first circuit further comprises:
    a fifth transistor having a gate electrode connected to the reset signal line, a first electrode connected to the second electrode of the fourth transistor, and a second electrode connected to the second node;
    a sixth transistor having a gate electrode connected to the reset signal line, a first electrode connected to the second node and the second electrode of the fifth transistor, and a second electrode connected to the first node;
    a seventh transistor having a gate electrode connected to a start signal line to which the start signal is applied, a first electrode connected to the first node, and a second electrode connected to the second node; and
    an eighth transistor having a gate electrode connected to the start signal line, a first electrode connected to the second node and the second electrode of the seventh transistor, and a second electrode connected to a voltage line to which a low voltage is applied.

7. The display device according to claim 1, wherein the third circuit outputs one carry signal and four gate signals based on the carry clock signal and the scan clock signals in response to an operation of the second circuit.

8. A gate driving circuit comprising:
stages each including a first circuit, a second circuit, and a third circuit to generate gate signals,
wherein the first circuit controls the second circuit based on a start signal, a reset signal, and a selection signal,
the second circuit controls a first node, a second node, and a third node in response to an operation of the first circuit,
the third circuit outputs a carry signal and the gate signals based on a carry clock signal and scan clock signals in response to an operation of the second circuit, and
the first circuit comprises:
a first reset transistor configured to turn on based on a potential of an Mth node to output the reset signal applied through a first electrode through a second electrode, where M is a real number;
a compensation capacitor having a first electrode connected to a gate electrode of the first reset transistor, and a second electrode connected to the second electrode of the first reset transistor;
a first transistor configured to turn on based on the selection signal to output an (I−2)th carry signal applied through a first electrode through a second electrode, where I is a real number;
a second transistor configured to turn on based on the selection signal to transmit the (I−2)th carry signal to the Mth node;
a third transistor configured to turn on based on a potential of the Mth node to transmit a first high voltage applied through a first high-voltage line to a node to which a first electrode of the second transistor and the second electrode of the first transistor are connected; and
a fourth transistor defined as the first reset transistor configured to turn on based on the potential of the Mth node to output the reset signal applied through the first electrode through the second electrode.

9. The gate driving circuit according to claim 8, wherein the reset signal is applied in a pulse form.

10. The gate driving circuit according to claim 8, wherein the first circuit further comprises:
a fifth transistor configured to turn on based on the reset signal to transmit the reset signal applied through the fourth transistor to the second node;
a sixth transistor configured to turn on based on the reset signal to electrically connect the first node and the second node to each other;
a seventh transistor configured to turn on based on the start signal to connect the first node and the second node to each other; and
an eighth transistor configured to turn on based on the start signal to transit a low voltage to the second node.

11. The gate driving circuit according to claim 8, wherein
the first transistor includes a gate electrode connected to a selection signal line to which the selection signal is applied, and a first electrode connected to an (I−2)th carry signal output terminal through which an (I−2)th carry signal is output,
the second transistor includes a gate electrode connected to the selection signal line, a first electrode connected to a second electrode of the first transistor, and a second electrode connected to the Mth node;
the third transistor includes a gate electrode connected to the Mth node, a first electrode connected to the first electrode of the second transistor and the second electrode of the first transistor, and a second electrode connected to a first high-voltage line to which the first high voltage is applied; and
the fourth transistor includes a gate electrode connected to the Mth node, a first electrode connected to a reset signal line to which the reset signal is applied, and a second electrode connected to the second electrode of the compensation capacitor.

12. The gate driving circuit according to claim 11, wherein the first circuit further comprises:
a fifth transistor having a gate electrode connected to the reset signal line, a first electrode connected to the second electrode of the fourth transistor, and a second electrode connected to the second node;
a sixth transistor having a gate electrode connected to the reset signal line, a first electrode connected to the second node and the second electrode of the fifth transistor, and a second electrode connected to the first node;
a seventh transistor having a gate electrode connected to a start signal line to which the start signal is applied, a first electrode connected to the first node, and a second electrode connected to the second node; and
an eighth transistor having a gate electrode connected to the start signal line, a first electrode connected to the second node and the second electrode of the seventh transistor, and a second electrode connected to a voltage line to which a low voltage is applied.

* * * * *